(12) United States Patent
Desai

(10) Patent No.: US 6,856,626 B2
(45) Date of Patent: Feb. 15, 2005

(54) BILLING REDUNDANT ATM CONNECTIONS

(75) Inventor: Vikrant H. Desai, Clairton, PA (US)

(73) Assignee: Marconi Communications, Inc., Warrendale, PA (US)

(*) Notice: Subject to any disclaimer, the term of this patent is extended or adjusted under 35 U.S.C. 154(b) by 651 days.

(21) Appl. No.: 09/740,151

(22) Filed: Dec. 18, 2000

(65) Prior Publication Data

US 2004/0213240 A1 Oct. 28, 2004

(51) Int. Cl.[7] .............................................. H04L 12/56
(52) U.S. Cl. ................. 370/395.32; 370/231; 370/235; 370/360; 370/386; 370/395.1
(58) Field of Search ................................ 370/231–235, 370/360, 386, 242–244, 254–255, 351–356, 395.1–395.7

(56) References Cited

U.S. PATENT DOCUMENTS

| | | | | |
|---|---|---|---|---|
| 6,009,080 A | | 12/1999 | Hanazawa | |
| 6,011,780 A | * | 1/2000 | Vaman et al. | 370/237 |
| 6,052,373 A | * | 4/2000 | Lau | 370/399 |
| 6,075,767 A | * | 6/2000 | Sakamoto et al. | 370/228 |
| 6,141,326 A | * | 10/2000 | Minami | 370/244 |
| 6,195,351 B1 | * | 2/2001 | Hiscock et al. | 370/389 |
| 6,307,834 B1 | * | 10/2001 | Worster | 370/218 |
| 6,347,073 B1 | * | 2/2002 | Hiscock et al. | 370/217 |
| 6,400,691 B2 | * | 6/2002 | Sakayori | 370/252 |
| 6,477,141 B1 | * | 11/2002 | Izawa et al. | 370/219 |
| 6,512,769 B1 | * | 1/2003 | Chui et al. | 370/232 |
| 6,674,756 B1 | * | 1/2004 | Rao et al. | 370/395.21 |

OTHER PUBLICATIONS

Takagi Koji, "Active Standby Changeover Device", Patent Abstracts of Japan, (Apr. 22, 1997).

* cited by examiner

*Primary Examiner*—Kenneth Vanderpuye
*Assistant Examiner*—Van Nguyen
(74) *Attorney, Agent, or Firm*—Ansel M. Schwartz

(57) ABSTRACT

An apparatus for transferring data on a network. The apparatus includes a switch comprising a primary component for switching the data through the switch. The apparatus includes a secondary component for switching the data through the switch if the primary component fails. The apparatus includes a mechanism for counting the data that has been received, transmitted or dropped by the switch without including any redundancy in the counting of the data due to the primary component and secondary component both able to switch data through the switch. A method for transferring ATM cells on a network. The method includes the steps of switching the ATM cells with an ATM switch of the ATM network having a primary component for switching the cells and a secondary component for switching the cells if the primary component fails. Then there is the step of counting the cells that have been received, transmitted or dropped by the switch without including any redundancy in the counting if the cells due to the primary component and secondary component both able to switch the cells through the switch.

18 Claims, 4 Drawing Sheets

BILLING REDUNDANT ATM CONNECTIONS

FIELD OF THE INVENTION

The present invention is related to billing redundant ATM connections. More specifically, the present invention is related to billing redundant ATM connections based on an accurate account based on the total cell counts received, transmitted or dropped obtained from both the primary and the secondary components.

BACKGROUND OF THE INVENTION

ATM switches can be used to setup connections between logical interfaces on the switch. These connections can allow data to flow through the switch in small pre defined packets called atm cells. The switch hardware can be configured to count the number of cells that have been received, transmitted or dropped through the switch. These cell counts are then utilized by various billing software packages to bill users for the amount of traffic that they have sent through the switch.

In case of redundant switch architectures a hardware component (primary component) is backed up by another identical hardware component (secondary component). When the primary component fails, the secondary component takes over. Failure can be defined as physical hardware component failures or as loss of signal/carrier on a fiber carrying data.

The secondary component taking over from the primary component prevents existing connections that have been setup from being torn down. Minimal data loss is experienced during this transition. However for redundant switch architectures cell flows through the primary and secondary components will be different depending on the component that is active. Therefore cell counts collected from the primary and secondary components will be different.

For billing connections that are setup in redundant hardware components, an accurate account of the total cell counts received, transmitted or dropped needs to be obtained from both the primary and secondary components and then combined in software appropriately.

This invention solves the problem of collecting the relevant hardware cell counters, combining them in software and ensuring that the cell counts collected represents an accurate count of total cells received, transmitted or dropped through the ATM switch.

SUMMARY OF THE INVENTION

The present invention pertains to an apparatus for transferring data on a network. The apparatus comprises a switch comprising a primary component for switching the data through the switch. The apparatus comprises a secondary component for switching the data through the switch if the primary component fails. The apparatus comprises a mechanism for counting the data that has been received, transmitted or dropped by the switch without including any redundancy in the counting of the data due to the primary component and secondary component both able to switch data through the switch.

The present invention pertains to a method for transferring ATM cells on a network. The method comprises the steps of switching the ATM cells with an ATM switch of the ATM network having a primary component for switching the cells and a secondary component for switching the cells if the primary component fails. Then there is the step of counting the cells that have been received, transmitted or dropped by the switch without including any redundancy in the counting if the cells due to the primary component and secondary component both able to switch the cells through the switch.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
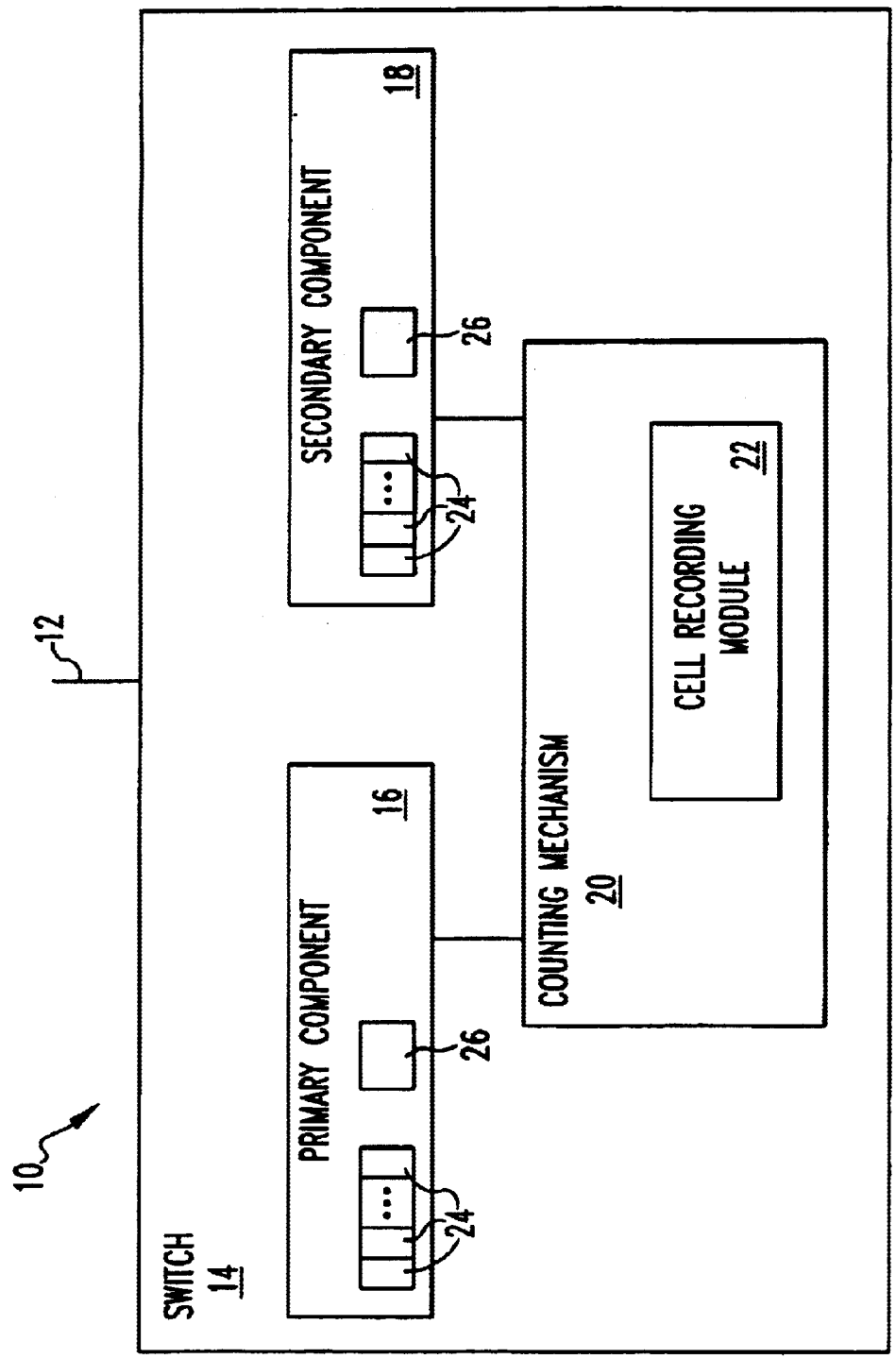
FIG. 4 is a schematic representation of the apparatus of the present invention.

Referring now to the drawings wherein like reference numerals refer to similar or identical parts throughout the several views, and more specifically to FIG. 4 thereof, there is shown an apparatus 10 for transferring data on a network 12. The apparatus 10 comprises a switch 14 comprising a primary component 16 for switching the data through the switch 14. The apparatus 10 comprises a secondary component 18 for switching the data through the switch 14 if the primary component 16 fails. The apparatus 10 comprises a mechanism for counting the data that has been received, transmitted or dropped by the switch 14 without including any redundancy in the counting of the data due to the primary component 16 and secondary component 18 both able to switch 14 data through the switch 14.

Preferably, the counting mechanism 20 counts data as ATM cells from the network 12 which is an ATM network 12. The counting mechanism 20 preferably includes a cell recording module 22 which combines cell counts calculated from the primary and secondary components 16, 18. Preferably, the module collects cell counts for each connection through the switch 14.

The module preferably counts cell counts from either the primary component 16 or the secondary component 18 depending upon which one is actually having the connection through the switch 14, otherwise known as an active component. Preferably, the primary component 16 and the secondary component 18 each have physical interfaces 24 and a logical interface 26 for both components that maintains a switchover count which counts whenever a physical component takes over the connection because the other component has failed, otherwise called a switchover event, and each physical interface 24 counts the number of cells of the connection that have passed through it.

The logical interface 26 preferably increases its switchover count whenever it receives a switchover event and clears cell counts on the active component. Preferably, the module counts the cell counts of the logical interface 26 on the active component for each connection in predetermined intervals.

The module preferably reviews the logical interface 26 at each interval to determine if the component with which it is associated has its switchover count increased since a previous interval. Preferably, the module counts cell counts from each physical interface 24 to determine a total number of cells that has passed through the switch 14, unless the switchover count has increased since the previous interval, in which case the cell count from the previous interval is subtracted from the cell count from the logical interface 26.

The present invention pertains to a method for transferring ATM cells on a network 12. The method comprises the steps of switching the ATM cells with an ATM switch 14 of the ATM network 12 having a primary component 16 for switching the cells and a secondary component 18 for switching the cells if the primary component 16 fails. Then there is the step of counting the cells that have been received, transmitted or dropped by the switch 14 without including any redundancy in the counting if the cells due to the primary component 16 and secondary component 18 both able to switch 14 the cells through the switch 14.

Preferably, the counting step includes the step of counting the cells with a cell recording module 22 which combines cell counts from the primary and secondary components 16, 18. The counting step preferably includes the step of counting cells with the module for each connection that passes through the switch 14. Preferably, the counting step includes the step of counting with the module from either the primary component 16 or the secondary component 18 depending on which one is actually having the connection through the switch 14, otherwise known as an active component.

The counting step preferably includes the step of maintaining a switchover count in each logical interface 26 of each component which maintains a switchover count which counts whenever the associated components takes over the connection because the other component has failed, otherwise called a switchover event, and counting with each logical interface 26 the number of cells of the connection that has passed through it. Preferably, the maintaining step includes the step of increasing by each logical interface 26 its switchover count whenever it receives a switchover event and then clearing cell counts on the active component.

The counting step preferably includes the step of counting the cell counts of each logical interface 26 on the active component for each connection at predetermined intervals. Preferably, the counting step includes the step of reviewing each logical interface 26 at each interval to determine if the component with which it is associated has its switchover count increased since a previous interval.

In the operation of the invention, the call recording module is responsible for collecting cell counts from various per connection hardware counters. This module implements the software algorithm for combining cell counts collected from the primary and secondary components 16, 18.

The hardware component that is actively involved in switching cells and carrying data is referred to as the "active" component. During the time that the switch 14 is running, the active component can be either the primary or secondary component. When the primary component 16 is running, the active component is the primary component 16. When the primary fails and the secondary takes over, the active component is the secondary component 18. If the secondary fails and the primary takes over again, the active component will be the primary component 16. The switchover between the primary and secondary components 16, 18 can occur multiple number of times while the switch 14 is active.

Every time a switchover occurs (i.e. the primary hardware fails and the secondary takes over or vice versa), a switchover event is generated on all logical interfaces 26 that are associated with the hardware component that switched over. Each logical interface 26 maintains a switchover count. On receiving a switchover event the logical interface 26 increases its switchover count and clears the cell counts on the active hardware component.

The following algorithm describes the set of actions taking place when a logical interface 26 receives a switchover event.

```
Increment logical_interface->switchover_count;
For all connections going through this logical interface {
    Zero hardware counts on the "active interface"
}
```

The call recording module keeps track of cell counters on the "active" hardware component by checking them on user-configured intervals. At every user-configured interval, the logical interfaces 26 associated with each connection are looked at to identify if the hardware associated with those interfaces switched over. If the hardware switched over (identified by the increased switchover count) between the previous interval and this one, cells counts are combined in one way. If the hardware did not switch over, cell counts are combined in a different way. The following algorithm describes how the cell counts collected from the currently "active" component are actually combined.

```
per_connection_information_stored_in_call_recording_database {
    total_cells; /* Total cells transmitted from all components while they
    were active. */
    last_interval_cells; /* Cells transmitted in the last user configured
    interval */
    cur_hw_ctr;      /* Total cell count from the active component */
    switchover_count; /* To compare with switchover count in logical
    interface */
}
For all connections in the database {
    Collect Counter Value for that connection from Active Hardware
    if (logical interface interface switchover counter increases) {
        /* A switchover occurred. The currently active hardware's
        cell count is valid. However the previous count is suspect.
        Discard the last interval counter */
        cur_hw_ctr = current cells read from hardware;
        last_interval_cells = cur_hw_ctr;
        switchover_count = logical_interface->switchover_count;
    } else {
        total_cells += last_interval_cells;
        last_interval_cells = current cells read from
        hardware – cur_hw_ctr;
        cur_hw_ctr = current cells read from hardware;
    }
}
```

Figure 1:
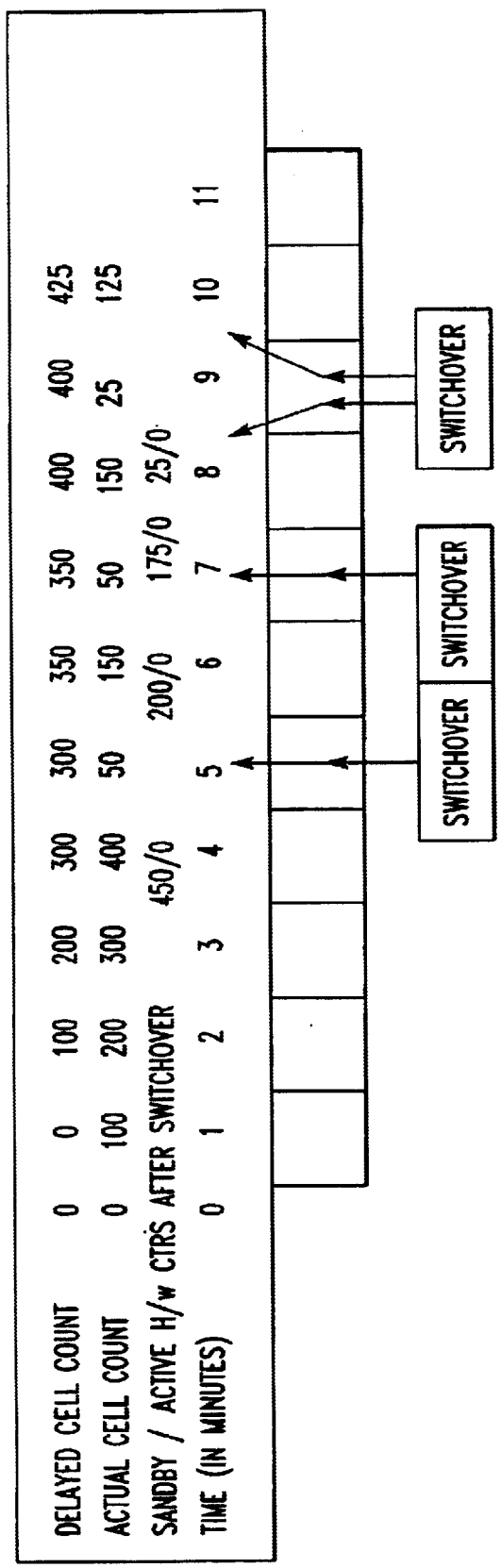
FIG. 1 is a schematic representation of how the counter-combining algorithm of the present invention operates.

FIG. 1 and Table 1 illustrate how the Counter-combining Algorithm works. FIG. 1 assumes that cells are uniformly sent at about 100 cells/minute.

| Notation: | |
|---|---|
| Time: | User Configured Interval when the hardware cell counts are collected. In this example the User Configured Interval is set to 60 seconds. |
| Actual Cell Count: | Cell Counts obtained from the current hardware component. |
| Standby |Active H/W: | Cell Counts from Standby/Active hardware component after Ctrs after Switchover switchover. (The terms "standby" and "active" refer to the standby and active hardware components after switchover. |

-continued

| Notation: | |
|---|---|
| Delayed Cell Count: | Cell counts after discarding 1 interval of data |

TABLE 1

| | Connection created | Interval Time | | | | | | | | | |
|---|---|---|---|---|---|---|---|---|---|---|---|
| | | 0 | 1 | 2 | 3 | 4 | 5 | 6 | 7 | 8 | 9 | 10 |
| Total Cells | 0 | 0 | 0 | 100 | 200 | 300 | 300 | 350 | 350 | 400 | 400 | 425 |
| Last Interval Cells | 0 | 0 | 100 | 100 | 100 | 100 | 50 | 100 | 50 | 100 | 25 | 100 |
| Current HW Ctr | 0 | 0 | 100 | 200 | 300 | 400 | 50 | 150 | 50 | 150 | 25 | 125 |
| Call Recording Switchover Ctr | 5 | 5 | 5 | 5 | 5 | 5 | 5 | 6 | 6 | 7 | 7 | 9 |
| Logical Interface Switchover ctr | 5 | 5 | 5 | 5 | 5 | 5 | 6 | 6 | 7 | 7 | 9 | 9 |
| Delayed Cell Count [After Losing 1 interval] | 0 | 0 | 0 | 100 | 200 | 300 | 300 | 350 | 350 | 400 | 400 | 425 |
| Physical Hardware Ctr | 0 | 0 | 100 | 200 | 300 | 400 | 50 | 150 | 50 | 150 | 25 | 125 |

Total Cells, Last Interval Cells, Current HW Ctr and Call recording Switchover Ctr are per connection structures stored in the call recording database. Logical Interface Switchover Counter is stored in the logical interface switchover counter and is incremented when ever a switchover occurs. The Delayed Cell Count is manually calculated by looking at cell counts after switchover occurs. This cell count is obtained by discarding data obtained in an interval where one or more switchovers occur and by adding all other cell count data after a delay of one interval. This count should be similar to the Total Cells count arrived at by using the algorithm.

Physical Hardware ctr are the cell counts obtained by looking at the actual "active" hardware counters.

Figure 2:
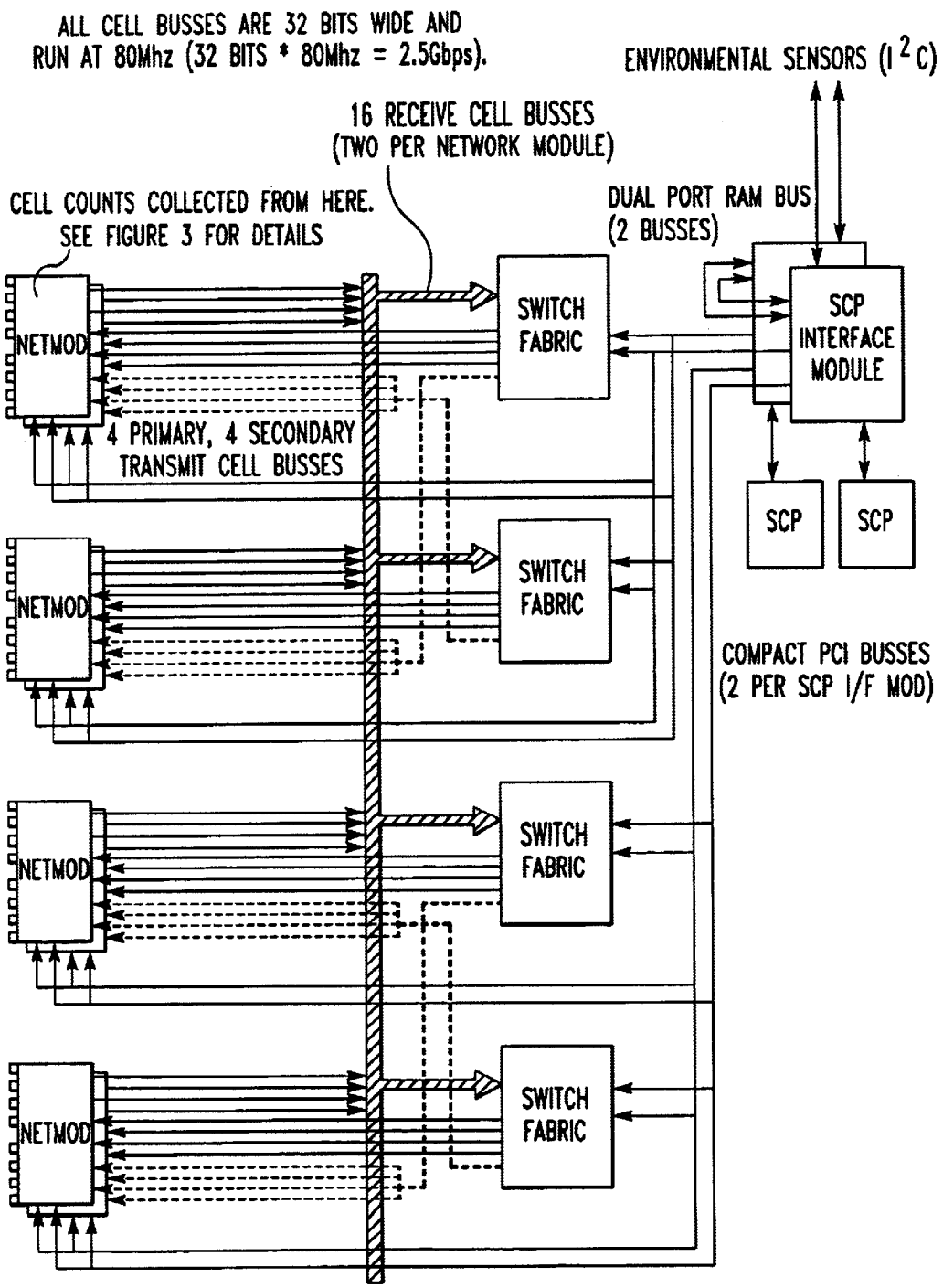
FIG. 2 is a schematic representation of where cell counts are obtained from in the present invention operates.
Figure 3:
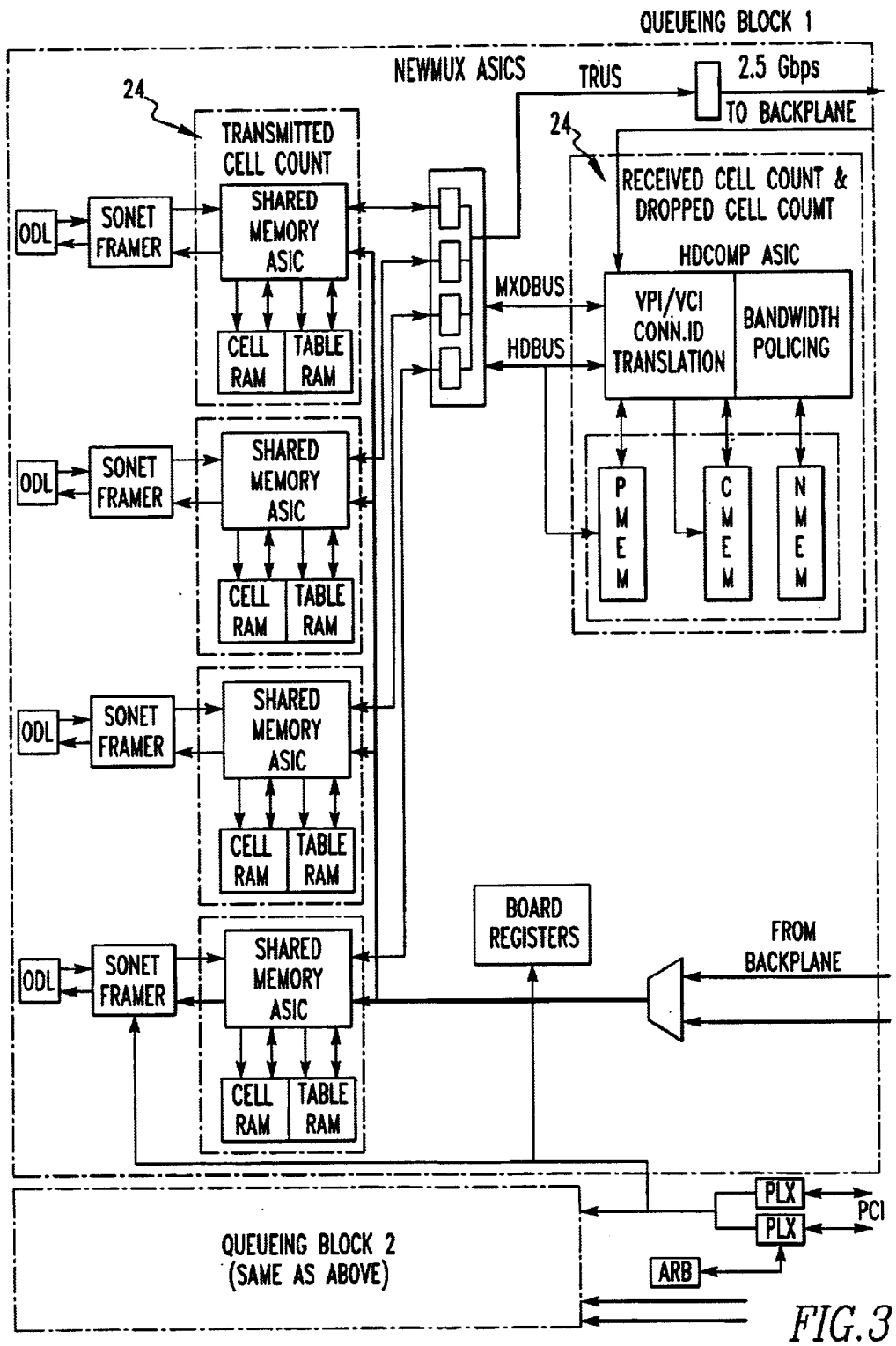
FIG. 3 is a schematic representation of the physical interfaces which count the transmitted cells, received cells or dropped cells.

FIGS. 2 and 3 show where the cell counts are obtained from. FIG. 3 shows the physical interface 24 which counts the transmitted cells, and the physical interface 24 which counts the received cells and the dropped cells.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for transferring data on a network comprising:
    a switch comprising a primary component for switching the data through the switch;
    a secondary component for switching the data through the switch if the primary component fails; and
    a mechanism for counting the data that has been received, transmitted or dropped by the primary component and the secondary component of the switch after a switchover event occurs, without including any redundancy in the counting of the data due to the primary component and secondary component both switching data through the switch at the same time.

2. An apparatus as described in claim 1 wherein the counting mechanism counts data as ATM cells from the network which is an ATM network.

3. An apparatus as described in claim 2 wherein the counting mechanism includes a cell recording module which combines cell counts calculated from the primary and secondary components.

4. An apparatus as described in claim 3 wherein the module collects cell counts for each connection through the switch.

5. An apparatus as described in claim 4 wherein the module counts cell counts from either the primary component or the secondary component depending upon which one is actually having the connection through the switch, otherwise known as an active component.

6. An apparatus as described in claim 5 wherein the primary component and the secondary component each have physical interfaces and a logical interface for both components that maintains a switchover count which counts whenever a physical component takes over the connection because the other component has failed, otherwise called a switchover event, and each physical interface counts the number of cells of the connection that have passed through it.

7. An apparatus as described in claim 6 wherein the logical interface increases its switchover count whenever it receives a switchover event and clears cell counts on the active component.

8. An apparatus as described in claim 7 wherein the module counts the cell counts of the logical interface on the active component for each connection in predetermined intervals.

9. An apparatus as described in claim 8 wherein the module reviews the logical interface at each interval to determine if the component with which it is associated has its switchover count increased since a previous interval.

10. An apparatus as described in claim 9 wherein the module counts cell counts from each physical interface to determine a total number of cells that has passed through the switch, unless the switchover count has increased since the previous interval, in which case the cell count from the previous interval is subtracted from the cell count from the logical interface.

11. A method for transferring ATM cells on a network comprising the steps of:
    switching the ATM cells with an ATM switch of the ATM network having a primary component for switching the cells and a secondary component for switching the cells if the primary component fails; and
    counting the cells that have been received, transmitted or dropped by the primary component and the secondary component of the switch after a switchover event occurs without including any redundancy of the counting of the cells due to the primary component and secondary component both switching the cells through the switch at the same time.

12. A method as described in claim 11 wherein the counting step includes the step of counting the cells with a cell recording module which combines cell counts from the primary and secondary components.

13. A method as described in claim 12 wherein the counting step includes the step of counting cells with the module for each connection that passes through the switch.

14. A method as described in claim 13 wherein the counting step includes the step of counting with the module from either the primary component or the secondary component depending on which one is actually having the connection through the switch, otherwise known as an active component.

15. A method as described in claim 14 wherein the counting step includes the step of maintaining a switchover count in each logical interface of each component which maintains a switchover count which counts whenever the associated components takes over the connection because the other component has failed, otherwise called a switchover event, and counting with each logical interface the number of cells of the connection that has passed through it.

16. A method as described in claim 15 wherein the maintaining step includes the step of increasing by each logical interface its switchover count whenever it receives a switchover event and then clearing cell counts on the active component.

17. A method as described in claim 16 wherein the counting step includes the step of counting the cell counts of each logical interface on the active component for each connection at predetermined intervals.

18. A method as described in claim 17 wherein the counting step includes the step of reviewing each logical interface at each interval to determine if the component with which it is associated has its switchover count increased since a previous interval.

* * * * *